(12) United States Patent
Radosav

(10) Patent No.: US 7,858,135 B2
(45) Date of Patent: Dec. 28, 2010

(54) INFUSION BREWING DEVICE AND METHOD FOR CONTROLLING SAME

(75) Inventor: Aleksandar Radosav, Quebec (CA)

(73) Assignee: Technologies Coffea Inc., Quebec (CA)

( * ) Notice: Subject to any disclaimer, the term of this patent is extended or adjusted under 35 U.S.C. 154(b) by 0 days.

(21) Appl. No.: 12/746,896

(22) PCT Filed: Jan. 4, 2008

(86) PCT No.: PCT/CA2008/000007

§ 371 (c)(1),
(2), (4) Date: Jun. 8, 2010

(87) PCT Pub. No.: WO2009/086613

PCT Pub. Date: Jul. 16, 2009

(65) Prior Publication Data

US 2010/0278988 A1 Nov. 4, 2010

(51) Int. Cl.
*A23F 5/00* (2006.01)
(52) U.S. Cl. .................. 426/433; 426/431; 426/432; 426/435; 99/279
(58) Field of Classification Search .............. 426/433, 426/431, 432, 435, 486; 99/279
See application file for complete search history.

(56) References Cited

U.S. PATENT DOCUMENTS

| | | | |
|---|---|---|---|
| 3,446,137 A | 5/1969 | Pryor et al. | |
| 3,552,976 A | 1/1971 | King | |
| 3,613,549 A | 10/1971 | Cheyney Champion | |
| 3,707,905 A | 1/1973 | Schwertfeger | |
| 4,112,830 A | 9/1978 | Saito | |
| 4,581,239 A * | 4/1986 | Woolman et al. | 426/433 |
| 4,742,767 A | 5/1988 | Komatsu et al. | |
| 4,791,859 A | 12/1988 | King | |
| 4,793,244 A | 12/1988 | King | |
| 4,886,955 A | 12/1989 | Kimura | |
| 4,967,647 A | 11/1990 | King | |
| 5,197,373 A | 3/1993 | De Jong | |
| D336,587 S | 6/1993 | Goldstein | |
| 5,297,472 A | 3/1994 | Suzuki et al. | |
| 5,303,639 A | 4/1994 | Bunn et al. | |
| 5,305,685 A | 4/1994 | Midden | |
| 5,309,820 A | 5/1994 | Baxter et al. | |

(Continued)

FOREIGN PATENT DOCUMENTS

FR 2646335 11/1990

(Continued)

*Primary Examiner*—Anthony Weier
(74) *Attorney, Agent, or Firm*—Sutherland Asbill & Brennan LLP

(57) ABSTRACT

The infusion brewing device has a steeping area configured and adapted to receive a filter, particulate steeping material and hot liquid water for steeping the particulate steeping material into an infusion. A vacuum chamber is positioned below the steeping area. The vacuum chamber has a hermetic wall, a closable lower outlet, and an upper opening leading to the steeping area. An inlet of a vacuum conduit is positioned in the vacuum chamber, above a maximum liquid level of the vacuum chamber and whereas an outlet thereof is connected to a vacuum source. The inlet is spaced from the wall by an inlet spacing distance. The vacuum source is operable to reduce the pressure in the vacuum chamber in a manner to draw the infusion through the filter and upper opening.

20 Claims, 1 Drawing Sheet

U.S. PATENT DOCUMENTS

| | | |
|---|---|---|
| 5,372,728 A | 12/1994 | Midden |
| 5,479,849 A | 1/1996 | King et al. |
| 5,697,288 A | 12/1997 | King |
| 5,836,169 A | 11/1998 | Marlette |
| 5,913,963 A | 6/1999 | King |
| 6,079,314 A | 6/2000 | Mackinnon |
| 6,176,172 B1 | 1/2001 | Stettes et al. |
| 6,253,664 B1 | 7/2001 | Giannelli |
| 6,272,973 B1 | 8/2001 | Fukushima et al. |
| 6,298,769 B1 | 10/2001 | Stettes et al. |
| 6,391,360 B1 | 5/2002 | Stettes et al. |
| 2004/0025703 A1 | 2/2004 | Ming |
| 2004/0149138 A1 | 8/2004 | Leung et al. |

FOREIGN PATENT DOCUMENTS

JP       11-221155     *   8/1999

* cited by examiner

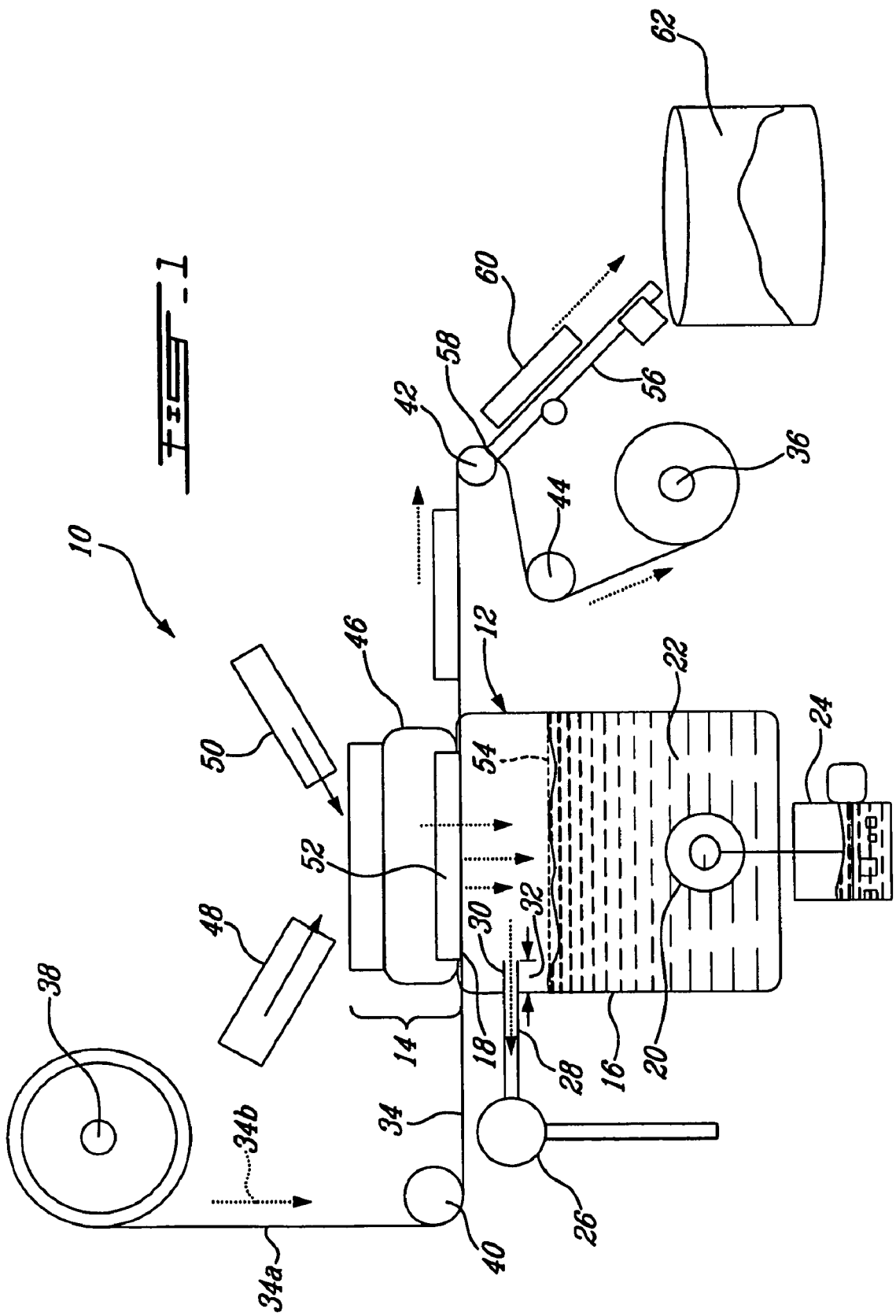

INFUSION BREWING DEVICE AND METHOD FOR CONTROLLING SAME

FIELD

This specification relates to a device and method for brewing an infusion such as coffee, tea and the like, and more specifically discloses improvements in vacuum-type infusion brewing.

BACKGROUND

Vacuum-type infusion brewing has been known for years in making coffee and other infusions, but has met limited success commercially due to several drawbacks. In summary, vacuum-type coffee brewing typically involves a device which has a lower vacuum chamber, and an upper steeping chamber with a filter therebetween. In use, coffee particles are let to steep in hot water in the upper chamber, during which time both the coffee particles and water are kept from proceeding to the lower chamber by the filter. After a given steeping time has been reached, the pressure in the lower chamber is lowered, i.e. a so-called "vacuum" is made, which draws the infusion through the filter and into the lower chamber.

To create the vacuum, a first known method is to use a piston which is lowered in the vacuum chamber. This has the drawback of involving many moving parts and is typically limited to providing beverages of a single given volume, associated to the stroke of the piston.

Another method is to use a vacuum pump. This second method can eliminate the need for the piston and allow more flexibility in the volume of the brewed beverage. However, it had a recognized drawback that a substantial amount of liquid reached the area adjacent the inlet and was is aspired by the vacuum pump. The liquid either came from upper chamber dripping, or from condensation occuring on the walls of the lower chamber, for example.

Several suggestions have been made in the past to deal with this drawback, which, although satisfactory to a certain degree, have met limited success. For instance, Suzuki et al., in U.S. Pat. No. 5,297,472, show a downwardly oriented vacuum inlet adjacent the wall of a vacuum chamber. Yet, drops nevertheless accumulated under the downwardly oriented tip of the vacuum inlet and a substantial amount of liquid was nevertheless aspired. By consequence, Suzuki et al. taught using a relatively complex and costly system to deal with the substantial amount of aspired liquid.

There thus remained room for improvement.

SUMMARY

The amount of liquid entering the vacuum pump can be substantially reduced by providing a spacing between the vacuum inlet and the wall of the vacuum chamber. In one embodiment, this can be achieved by using a vacuum tube having a re-entrant inlet end, for example.

By reducing the amount of aspired liquid, as compared to former devices and methods, the need for a complex liquid evacuation or treatment system in the vacuum pump circuit can be reduced or eliminated. The overall cost of the brewing device can thus be accordingly reduced, which can result in a device which is more commercially viable.

Henceforth, in accordance with one aspect, there is provided an infusion brewing device comprising a steeping area configured and adapted to receive a filter, particulate steeping material and hot liquid water for steeping the particulate steeping material into an infusion, a vacuum chamber positioned below the steeping area, the vacuum chamber having a hermetic wall, a closable lower outlet, and an upper opening leading to the steeping area, and a vacuum conduit having an inlet positioned in the vacuum chamber, above a maximum liquid level of the vacuum chamber, and spaced from the wall by an inlet spacing distance, and having an outlet connected to a vacuum source operable to reduce the pressure in the vacuum chamber in a manner to draw the infusion through the filter and upper opening.

In accordance with another aspect, there is provided a method for controlling an infusion brewing device having a steeping area where particulate matter can be steeped in hot water on a filter for a given period of time to obtain a liquid infusion, and a vacuum chamber positioned below the steeping area and having an upper opening connected thereto, a hermetic wall, and an openable lower outlet, and a vacuum source having an inlet in the vacuum chamber, the method comprising: receiving an indication that the given period of time is reached; and upon receiving the indication, commanding the vacuum source to draw gas from the vacuum chamber through the inlet, at a given inlet spacing distance from the wall, thereby drawing the liquid infusion successively through the filter and the upper opening, into the vacuum chamber.

In accordance with another aspect, there is provided a infusion brewing device comprising a vacuum chamber having a hermetic wall, an upper opening and a closable lower outlet, and a vacuum conduit having an inlet in the vacuum chamber, above a maximum liquid level of the vacuum chamber, and an outlet connected to a vacuum source, the brewing device being CHARACTERIZED IN THAT the vacuum conduit inlet is spaced from the wall by a given inlet spacing distance.

DESCRIPTION OF THE FIGURE

FIG. 1 is a schematic view showing an embodiment of the brewing device.

DETAILED DESCRIPTION

Referring to FIG. 1, the brewing device 10 generally has a vacuum chamber 12 and a steeping area 14. The vacuum chamber 12 has a hermetic wall 16, an upper opening 18 leading to the steeping area 14, and a lower outlet 20 through which the infusion 22 can be outputted to a vessel such as a cup 24. A vacuum source 26 is connected to the vacuum chamber 12 by a vacuum conduit 28. The vacuum conduit 28 has a vacuum inlet 30 positioned in the vacuum chamber 12, and spaced from the wall 16 by a given inlet spacing distance 32.

A filter 34 is positioned between the vacuum chamber 12 and the steeping area 14, and generally separates the one from the other. In this embodiment, the filter 34 is provided in the form of an elongated sheet 34a which can be advanced along a filter path 34b between successive brewings to expose successive portions to the upper opening 18. To this end, a driven roller 36 and an idle roller 38 are provided, and a plurality of guiding rolls 40, 42, 44 guide the filter 34 unrolled from the idle roller 38 by the driven roller 36 along the filter path 34b.

The steeping area 14 has an enclosure 46 which can be moved between a lowered position and a raised position (only the lowered position is shown). A particulate material feeder 48 and a hot water feeder 50 are also provided and oriented toward the enclosure 46. In use, the enclosure 46 is lowered on a clean section of the filter 34. Particulate material 52, such as milled coffee or tea for example, is fed into the enclosure by the particulate material feeder 48. Hot water is fed into the enclosure from the hot water feeder 50. The particulate material 52 is then let to steep with the hot water in the enclosure 46 for a given period of time. During steeping the liquid is prevented from escaping laterally by the enclosure 46, and is kept from escaping downwardly to the vacuum chamber 12 by the filter 34. In this embodiment, the upper opening 18 of the vacuum chamber 12 has a grate, and a screen positioned on the grate (both of which are not shown). In use, both the screen and the grate support the filter 34 and the liquid pressure.

Once it is determined that a given steeping time has been reached, the vacuum source 26 is operated to draw air from the vacuum chamber 12 and thereby lower the air pressure in the vacuum chamber 12. This has the effect that the infusion is drawn from the enclosure into the vacuum chamber 12, through the filter 34, grate, and screen, because the atmospheric pressure pushes the liquid therethrough. Being spaced from the wall 16 by a given spacing distance 32, droplets of infusion liquid forming on the wall 16 of the vacuum chamber 12, and dripping therealong, do not pass or accumulate adjacent to the vacuum conduit inlet 30, and the amount of liquid aspired in the vacuum conduit 28 can be negligible.

The steeping process can be repeated any number of times, until a given volume of infusion 22 is accumulated in the vacuum chamber 12, such as depending on the size of beverage requested by a user for example, or until a maximum level 54 of liquid in the vacuum chamber 12 is reached. Once the volume of infusion is reached, the brewing is stopped, and the outlet 20 of the vacuum chamber 12 is opened to let the infusion 22 into the vessel 24.

After each successive steeping and vacuuming operation, the enclosure 46 is raised and the filter 34 is advanced on the filter path 34b. The particulate material 52 from which soluble elements were extracted by steeping are not drawn into the vacuum chamber 12, and thus remain on the filter 34. In this embodiment, a scraper 56 is fixedly positioned relative the filter path 34b, and has an edge 58 which abuts against the filter 34. As the filter 34 and particulate material 52 are advanced, the particulate material encounters the scraper 56 and is thereby substantially removed from the filter. The scraper is downwardly sloped, and the removed particulate material 60 thus slides therealong under the effect of gravity and subsequently falls into a waste container 62.

In the case of an automatic brewing device as described above and illustrated, a controller (not shown) can be provided to command one or more of the different steps of the brewing method and to receive one or more indications from respective components of the brewing device.

For illustrative purposes, in the example given above, the vacuum chamber 12 is designed to have a capacity of 16 ounces of fluid, and the maximum fluid level 54 corresponds to this volume. In other embodiments, different sizes of vacuum chamber can be used, to satisfy alternate specific needs. Also, in this embodiment, the vacuum source has a −700 millibar vacuum pump, though it will be understood that the selection of a specific vacuum pump can depend on the specificities of alternate embodiments. It will also be understood that an alternate vacuum source can be used, such as a piston and cylinder assembly, for example.

The diameter of the vacuum conduit can have an effect on the amount of liquid which is aspired. Typically a larger diameter will increase the speed at which the vacuum source operates on the air pressure in the vacuum chamber, i.e. it lowers the resistance to air flow, but may allow more liquid to be aspired. A compromise should thus be sought. For illustrative purposes, in the example given above, a vacuum conduit 28 having a thin straight tube having about 2 mm internal diameter was selected, although this may vary in alternate embodiments depending for example on the vacuum source used and on the volume of the vacuum chamber.

Using a vacuum conduit which extends horizontally into the vacuum chamber can have a beneficial effect on the amount of aspired liquid as compared to a conduit which slopes upwardly or downwardly. However, sloping vacuum conduits can nevertheless be appropriate for some alternate embodiments.

In the example given above, the vacuum inlet is provided at the tip of the vacuum conduit. In alternate embodiments, the shape of the vacuum conduit can vary, and the vacuum inlet can be provided on a side of the vacuum conduit, for example. Also, the vacuum conduit can alternately penetrate the vacuum chamber through an upper portion of the wall, and be straight or elbowed, for example.

The exact amount of inlet spacing distance between the vacuum inlet and the vacuum chamber wall can vary. A minimum spacing should nevertheless be maintained in alternate embodiments. The exact minimum spacing can vary depending on the vacuum source, the internal and external diameter of the vacuum inlet and the volume of the vacuum chamber. The minimum spacing can be that of the width of a drop of the infusion or of the width of a streaming film of the infusion traveling downwardly along the wall, for example.

The steeping area of the brewing device can greatly depart from that which is described and illustrated herein. For example, an alternate embodiment of the brewing device can be manual instead of automatic. It will thus be understood that any suitable filter positioning system or method can be used in alternate embodiments.

The examples described above and illustrated are thus exemplary only. The scope is indicated by the appended claims.

What is claimed is:

1. An infusion brewing device comprising a steeping area configured and adapted to receive a filter, particulate steeping material and hot liquid water for steeping the particulate steeping material into an infusion, a vacuum chamber positioned below the steeping area, the vacuum chamber having a hermetic wall, a closable lower outlet, and an upper opening leading to the steeping area, and a vacuum conduit having an inlet positioned in the vacuum chamber, above a maximum liquid level of the vacuum chamber, and spaced from the wall by an inlet spacing distance, and having an outlet connected to a vacuum source operable to reduce the pressure in the vacuum chamber in a manner to draw the infusion from the steeping area through the filter and upper opening.

2. The brewing device of claim 1 wherein the vacuum conduit has a tube having a re-entrant end in the vacuum chamber, the re-entrant end having the inlet.

3. The brewing device of claim 2 wherein the re-entrant end of the tube extends substantially horizontally in the vacuum chamber.

4. The brewing device of claim 1 wherein the vacuum source has a vacuum pump.

5. The brewing device of claim 1 wherein the upper opening has a grate configured and adapted to support the filter during steeping and operation of the vacuum source.

6. The brewing device of claim 5 wherein the upper opening further has a screen positioned above the grate.

7. The brewing device of claim 1 wherein the steeping area has an enclosure configured and adapted to prevent the hot liquid and particulate matter from escaping laterally during steeping and operation of the vacuum source.

8. The brewing device of claim 7 wherein the filter is provided in the form of an elongated sheet material, further comprising a filter displacement mechanism configured and adapted to position successive portions of the filter above the upper opening for respective successive steepings, and wherein the enclosure is movable to a raised position to allow displacement of the filter and particulate matter after the respective successive steepings.

9. The brewing device of claim 8 further comprising a scraper fixedly positioned in a displacement path of the filter, after the steeping area, for separating the displaced particulate matter from the filter.

10. The brewing device of claim 1 wherein the vacuum source is positioned outside the vacuum chamber.

11. A method for controlling a infusion brewing device having a steeping area where particulate matter can be steeped in hot water on a filter for a given period of time to obtain a liquid infusion, and a vacuum chamber positioned below the steeping area and having an upper opening connected thereto, a hermetic wall, and an openable lower outlet, and a vacuum source having an inlet in the vacuum chamber, the method comprising:

receiving an indication that the given period of time is reached;

upon receiving the indication, commanding the vacuum source to draw gas from the vacuum chamber through the inlet, at a given inlet spacing distance from the wall, thereby drawing the liquid infusion successively through the filter and the upper opening, into the vacuum chamber.

12. The method of claim 11 further comprising: receiving an indication that the liquid infusion has been drawn into the vacuum chamber.

13. The method of claim 12 further comprising, subsequently to receiving the indication that the liquid infusion has been drawn into the vacuum chamber, commanding the vacuum source to stop drawing gas.

14. The method of claim 13 further comprising: commanding the lower outlet to open after the vacuum source has been stopped.

15. The method of claim 12 further comprising, subsequently to receiving the indication that the liquid infusion has been drawn into the vacuum chamber, commanding an enclosure of the steeping area to be raised.

16. The method of claim 15 further comprising, displacing the filter after the enclosure has been raised.

17. The method of claim 11 further comprising commanding to provide particulate matter and hot water into the steeping area, monitoring the amount of time during which the particulate matter is steeped in hot water in the steeping area, and determining when the given period of time is reached.

18. A infusion brewing device comprising a vacuum chamber having a hermetic wall, an upper opening and a closable lower outlet, and a vacuum conduit having an inlet in the vacuum chamber, above a maximum liquid level of the vacuum chamber, and an outlet connected to a vacuum source, the brewing device being CHARACTERIZED IN THAT the vacuum conduit inlet is spaced from the wall by a given inlet spacing distance.

19. The brewing device of claim 18 characterized in that the vacuum conduit has a tube having a re-entrant end in the vacuum chamber, the re-entrant end having the inlet.

20. The brewing device of claim 19 characterized in that a steeping area configured and adapted to receive a filter, particulate steeping material and hot liquid water for steeping the particulate steeping material into an infusion, is positioned above the vacuum chamber, in communication with the upper opening.

* * * * *